United States Patent [19]
Polti et al.

[11] Patent Number: 5,907,101
[45] Date of Patent: May 25, 1999

[54] SAFETY CAP WITH MANOMETER PRESSURIZED CONTAINERS LOCKING UNDER HIGH PRESSURE

[75] Inventors: Franco Polti, Olgiate Comasco; Mauro Pogliani, Villa Guardia, both of Italy

[73] Assignee: Polti S.P.A., Bulgarograsso, Italy

[21] Appl. No.: 08/987,373

[22] Filed: Dec. 9, 1997

[30] Foreign Application Priority Data

Dec. 20, 1996 [EP] European Pat. Off. ............. 96830638

[51] Int. Cl.⁶ .................................................. G01L 7/04
[52] U.S. Cl. ............................. 73/714; 73/732; 73/756; 215/228; 340/451; 340/626
[58] Field of Search ............................. 73/7.4, 756, 732; 215/228; 340/451, 626

[56] References Cited

U.S. PATENT DOCUMENTS

| | | | |
|---|---|---|---|
| D. 333,623 | 3/1993 | Doyle | D10/46 |
| 3,622,976 | 11/1971 | Howard | 340/451 |
| 4,420,981 | 12/1983 | Schoen | 73/756 |
| 5,349,866 | 9/1994 | Huang | 73/727 |

FOREIGN PATENT DOCUMENTS

| | | |
|---|---|---|
| 0337528 | 10/1989 | European Pat. Off. . |
| 0400514 | 12/1990 | European Pat. Off. . |
| 0744566 | 11/1996 | European Pat. Off. . |
| 2627839 | 9/1989 | France . |

*Primary Examiner*—Joseph L. Felber
*Attorney, Agent, or Firm*—Sheridan Ross P.C.

[57] ABSTRACT

A safety cap for containers under steam pressure contains internally a diaphragm that is actuated by the pressure of steam in such a way as to break the mechanical connection between a closure member forming part of the cap and screwed onto the container, and a knob forming part of the cap and by means of which the latter can be screwed on and off. In order to increase the safety features of the cap, the latter is fitted with a manometer, incorporated in the cap and readable from the outside, which detects the pressure of steam in the container.

12 Claims, 3 Drawing Sheets

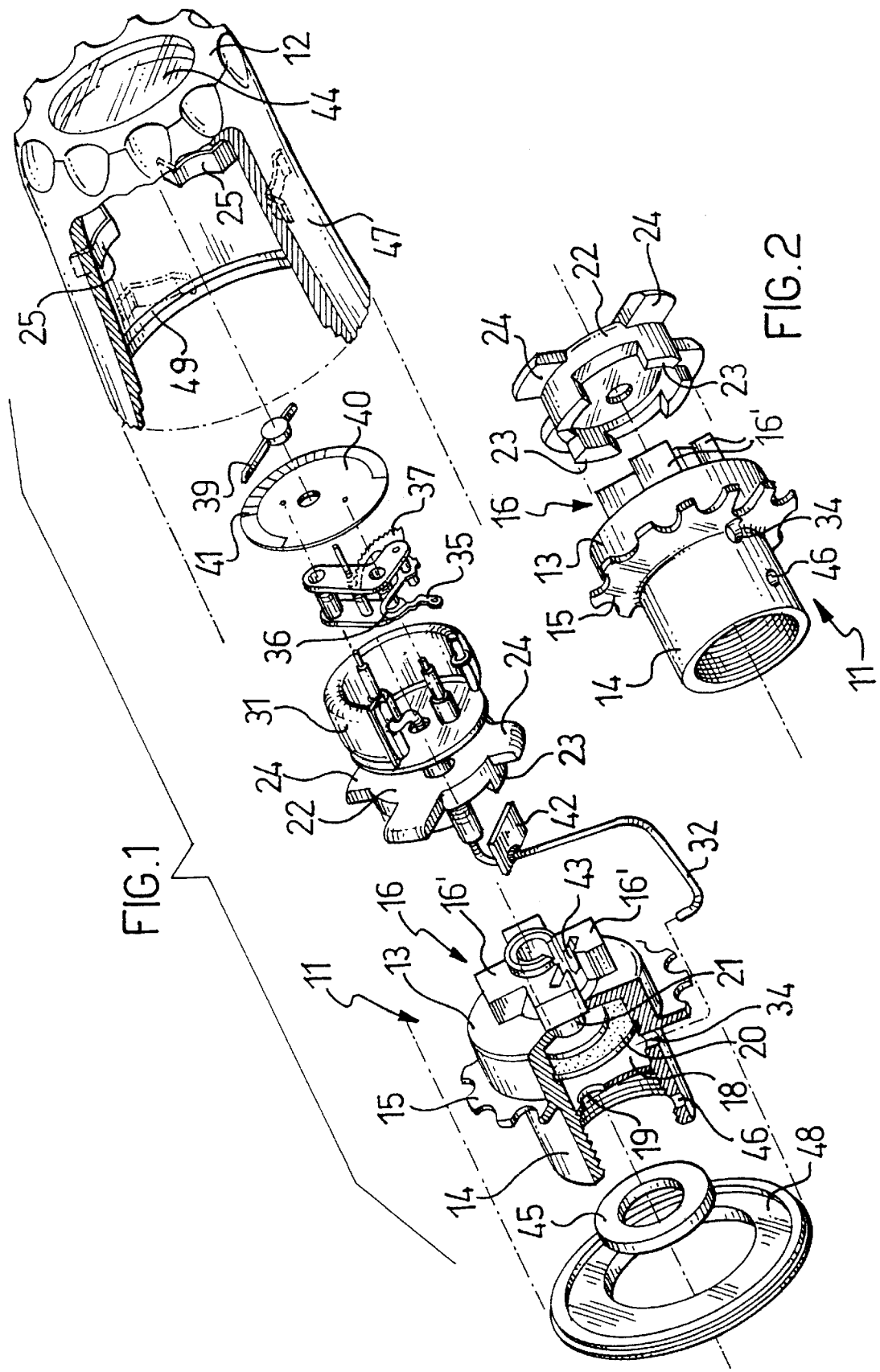

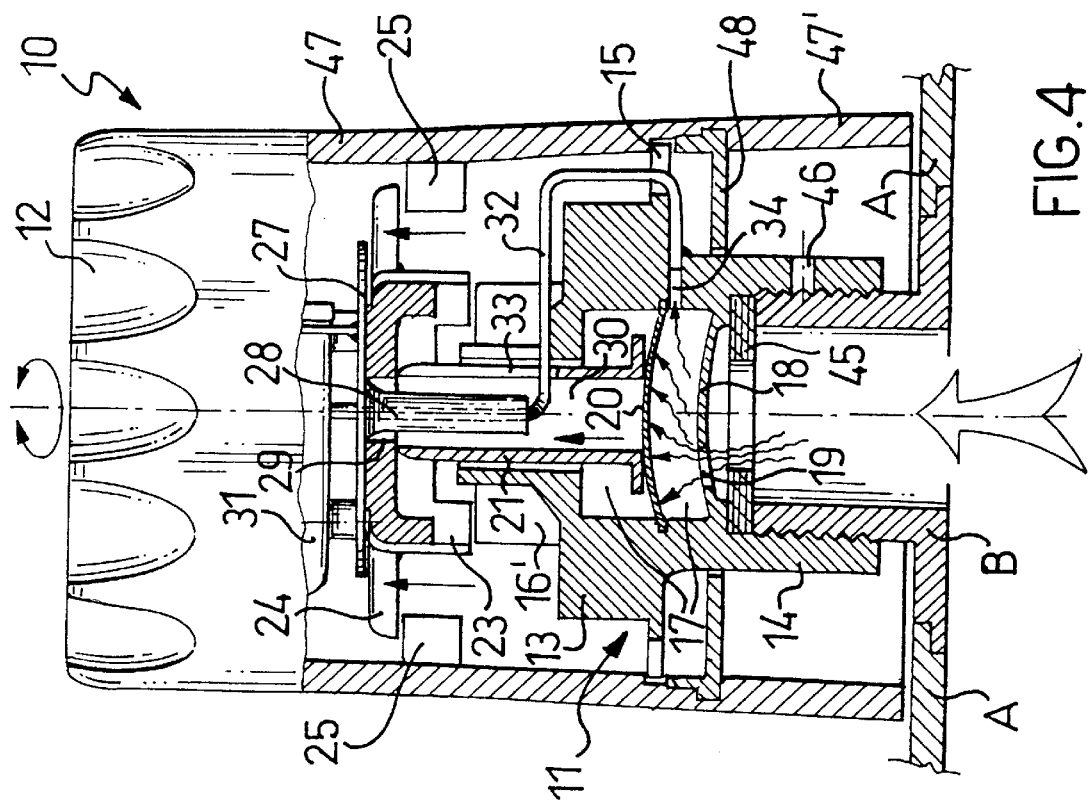
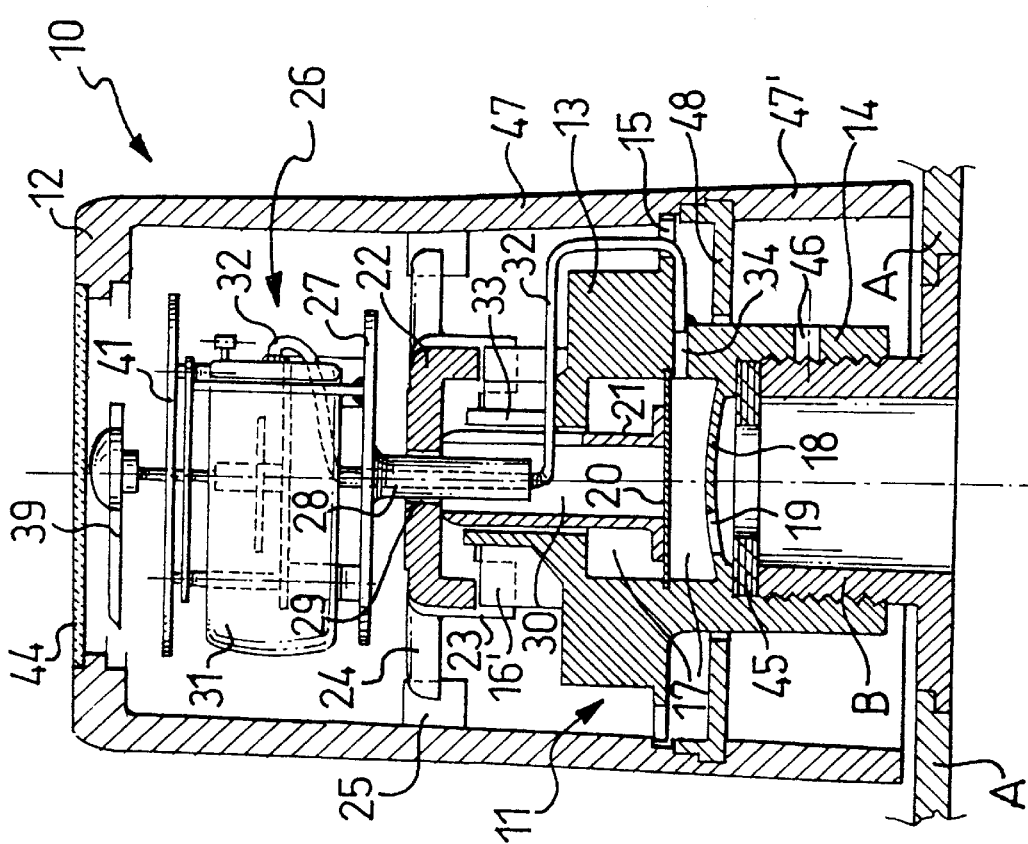

SAFETY CAP WITH MANOMETER PRESSURIZED CONTAINERS LOCKING UNDER HIGH PRESSURE

FIELD OF THE INVENTION

The present invention relates to a safety cap which is used to close a container containing steam under pressure, such as, for example, the boiler of a steam generator.

BACKGROUND OF THE INVENTION

European Patent No. 0 337 528 discloses a safety cap for a container containing steam under pressure, comprising a closure member screwed onto the mouth of the container, an external knob which the user can turn to screw the closure member on and off, and an internal diaphragm which is moved by the action of the pressure of the steam. When the pressure of steam in the container is zero or low, the diaphragm is in a rest position, and the closure member and knob are coupled in rotation to allow the cap to be unscrewed. As the pressure of the steam rises, the diaphragm moves into an operating position and uncouples the knob from the closure member to prevent the closure member from being unscrewed.

This safety cap therefore prevents the container from being opened when there is high steam pressure inside it and prevents the pressurized steam from escaping violently and injuring the user.

This safety cap finds advantageous application in, for example, the boilers of steam generators for domestic use, e.g. for supplying steam irons, cleaning equipment, etc. Its virtue is that the domestic user is often technically unskilled and therefore lacks the necessary awareness and understanding to handle a pressure boiler.

It is precisely because of the great danger represented by a container of steam under pressure, and the inexperience of those who usually use it, that it is so important to improve the closure cap of the container in such a way as to lower the risk margin, and hence the likelihood of accidents, towards zero.

SUMMARY OF THE INVENTION

It is an object of the present invention to provide a safety cap that satisfies this requirement.

This object is achieved by means of a safety cap of the type described above, characterized in that it comprises a manometer, incorporated in the cap and readable from the outside, which detects the pressure of steam in the container.

BRIEF DESCRIPTION OF THE DRAWINGS

The invention will be understood more clearly from the following description of a non-restrictive example of an embodiment thereof, illustrated in the accompanying drawings in which:

FIG. 1 is an exploded perspective view of a safety cap according to the invention;

FIG. 2 shows two components of the cap of FIG. 1 in a different exploded perspective view;

FIGS. 3, 4 are two views in longitudinal section showing how the cap of FIG. 1 works;

DETAILED DESCRIPTION OF THE PREFERRED EMBODIMENT

Figure 5:
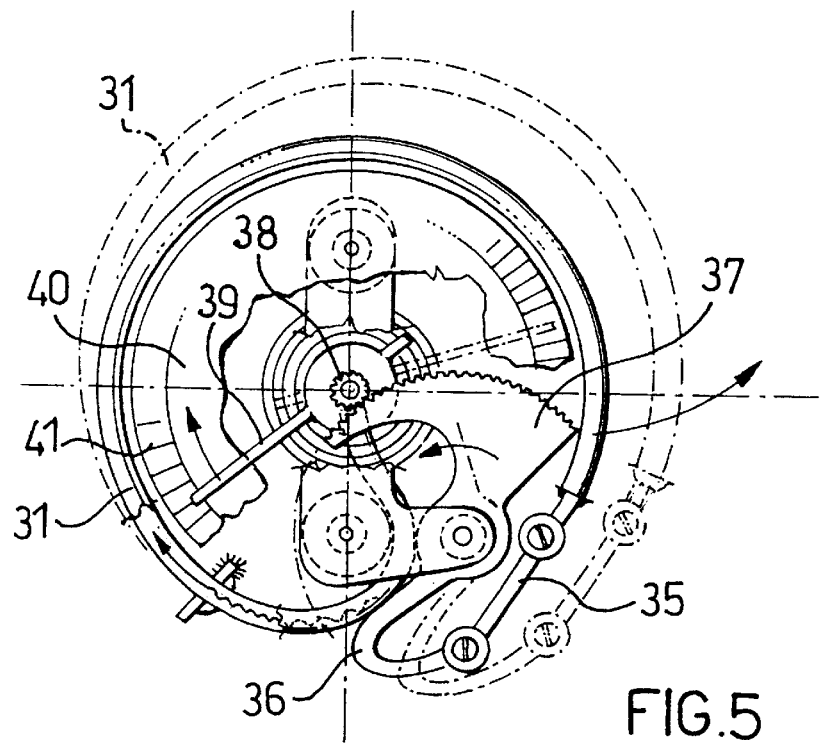
FIG. 5 shows in plan view how a mechanism of the cap of FIG. 1 works.
Figure 6:
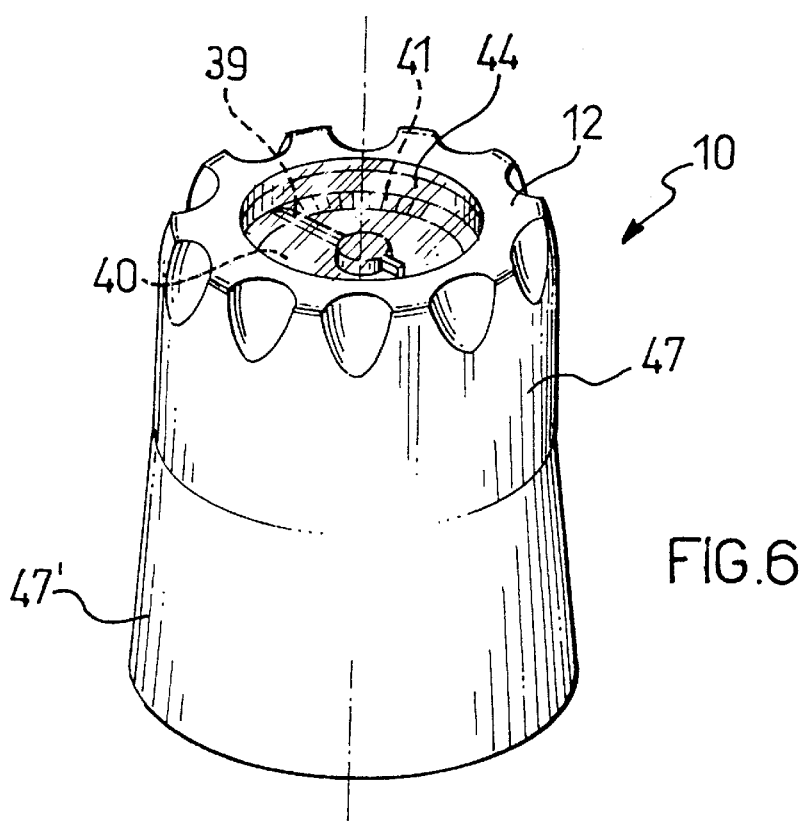
FIG. 6 is a perspective view of the cap of FIG. 1 in the assembled state.

The cap illustrated, which is given the general reference 10, comprises a closure member 11 and a knob 12 connected to it.

The closure member 11 is internally hollow and comprises a cylindrical head 13 and an internally threaded shank 14, also cylindrical. The head 13 includes an external toothed ring 15 which fits into an internal annular throat 49 in the knob 12. On the top of the head 13 there is also a spider part 16. Inside the head 13, a cavity 17 is bounded at the bottom by an arcuate wall 18 containing an eccentric hole 19 allowing communication between the cavity and the interior of the shank 14. The cavity 17 houses an elastic diaphragm 20 which is securely attached all the way around its circumference to the walls of the cavity. The bottom end of a bush 21 rests on the diaphragm 20. Resting on the top end of the bush 21 is a disc 22 with four longitudinal teeth 23 and four radial teeth 24 around its perimeter; the longitudinal teeth 23 fit into the spaces between the arms 16' of the spider 16, while the radial teeth 24 fit into the spaces between four internal projections 25 from the knob 12.

A manometer 26 is incorporated in the knob 12. The manometer 26 comprises a base 27 which includes a downward stem 28 that passes through an axial through hole 29 in the disc 22 and into the inside 30 of the bush 21. The base 27 supports a flat, elliptically-sectioned tubular component 31 extending in an arc of a circle. One end of the tubular component 31 is connected to one end of a tube 32 of small section. The tube 32 runs down through the stem 28, passes out of the stem and then out of the bush 21 through a longitudinal slot 33 in the bush itself and enters through a transverse through hole 34 in the head 13 of the closure member 11. This hole 34 opens into the space between the wall 18 and the diaphragm 20 so that the tube 32 places this space in communication with the inside of the tubular component 31. At the opposite end from that connected to the tube 32, the tubular component 31 is connected to a rod 35 which in turn is hinged to a lever 36 integral with a sector gear 37; the sector gear 37 meshes with a pinion 38 attached to an indicator needle 39. The indicator needle 39 is mounted on a dial 40 showing a graduated scale 41 giving pressure values. The manometer 26, which weighs very little, is supported simply by resting on a horizontal length of tube 32 on the head 13 of the closure member 11 and is fixed in position by a plate 42 attached to the tube 32 and inserted in a seat 43 formed in the spider 16. The indicator needle 39 and the dial 40 lie behind a transparent wall 44 in the top of the knob 12.

The cap 10 as described and illustrated is intended to close a container in which steam is generated under pressure, e.g. the boiler of a steam generator designed for use in the home. This container of which FIGS. 3 and 4 show a portion of the upper wall, marked A, in section, includes an externally threaded mouth B allowing communication between the interior of the container and the outside. The cap 10 is fitted to the container by screwing the threaded shank 14 of the closure member 11 of the cap onto the mouth B. To screw the cap 10 on, the user rotates the knob 12, which transmits rotary motion to the toothed disc 22 because of the engagement of the projections 25 of the knob with the teeth 24 of the disc, and the disc 22 in turn transmits rotary motion to the closure member 11 because of the engagement of the teeth 23 with the arms 16' of the spider 16. A seal 45 is housed in the root of the shank 14 and projects radially inwards from the root to provide leaktightness between the closure member 11 and the mouth B.

Operationally, with reference to FIGS. 3 and 4, when pressurized steam is generated in the container, this pressurized steam passes into the cap 10 as far as the cavity 17 upstream of the diaphragm 20 via the hole 19, and acts on one side of the diaphragm pushing it upwards as shown in FIG. 4. The upward movement of the diaphragm 20 causes an upward movement of the bush 21 and hence of the disc 22, so that the teeth 23 of the disc 22 disengage from the arms 16' of the spider 16 and the teeth 24 of the disc disengage from the projections 25 of the knob 12, the result of which is that there is no longer any connection between the closure member 11 and the knob 12. At the same time the steam enters the tube 32 through the hole 34 and reaches the hollow tubular component 31; the pressure of the steam causes the curvature of this part 31 to change and, as shown in FIG. 5, by means of the rod 35, lever 36, sector gear 37 and pinion 38, the needle 39 is caused to rotate to a point on the graduated scale 41 corresponding to the value of the pressure in the container.

In this way the operator, by simple observation of the manometer 26, and in particular the position of the needle 39, through the transparent wall 44, is made aware of the existence of pressurized steam inside the container. If, nonetheless, the operator tries to unscrew the cap 10 by turning the knob 12 in spite of the indication provided by the manometer 26, the knob will rotate loosely round the closure member 11 since it has been disconnected from the latter, thus preventing the unscrewing of the cap. In its loose rotation about the closure member 11, the knob 12 is guided by the connection between the ring 15 and the throat 49.

A transverse through hole 46 is formed in the shank 14 of the closure member 11 at an intermediate point along its length. If for any reason the user does manage to unscrew the cap 10 while there is still steam under pressure inside the container, the hole 46 will open onto the exterior before the cap is fully unscrewed and the steam under pressure will thus vent to the outside through this hole, thus warning the operator of the presence of steam under pressure in the container.

When the pressure of steam in the container drops or reaches zero, the diaphragm 20 sinks back down to its initial position as shown in FIG. 3. The bush 21 sinks with the diaphragm 20 so that the teeth 23 of the disc 22 re-engage with the arms 16' of the spider 16 and the teeth 24 of the disc re-engage with the projections 25 of the knob 12, reconnecting the knob to the closure member and thereby making it possible to unscrew the cap from the container. Should the abovementioned components not engage immediately with each other, the initial rotation of the knob 12 will be sufficient to bring such engagement about.

It will be clear from the aforegoing that the cap 10 offers valuable safety guarantees, avoiding the risk of accidents due to sudden escapes of pressurized steam from the container or, in the most serious case, explosion of the container due to excessive pressure. In particular, the combination of the manometer with the system for mechanically uncoupling the closure member from the knob gives enhanced security since the operator is first given a visual indication of the dangerous situation and, if that goes unnoticed, the operator is still protected by the mechanical uncoupling. Obviously the vent hole 46 represents yet another safety feature.

The location of the needle 39 and of the scale 41 at the top of the cap allows them to be read immediately.

The graduated scale 40 is preferably divided into two bands, namely a green-colored band corresponding to zero pressure or low pressures in the container, followed by a red-colored band corresponding to higher pressures in the container at values at which the container must not be opened.

It may be remarked that the high degree of safety is provided with a cap having the same dimensions as known caps of this type thanks to the compact dimensions of the manometer 26 components. The path followed by the tube 32 of the manometer 26 for collecting the pressure signal from upstream of the diaphragm 20 is particularly advantageous inasmuch as it does not obstruct the correct working of the mechanical uncoupling system; the slot 33 in the bush 21 allows the bush to move relative to the tube 32 during the movement of mutual mechanical coupling or uncoupling of the closure member 11 and knob 12.

The eccentric position of the hole 19 and the radially inward-projecting position of the seal 45 that comes partly over the hole, protect the hole from spurts of boiling water and thus prevent lime from forming in the hole and blocking it up.

The knob 12 comprises a cylindrical skirt 47 in which the internal components of the cap 10 are enclosed and which extends past the lower end of the shank 14 of the closure member 11; the knob also comprises an internal transverse annular closing wall 48 through which the shank 14 passes. The skirt 47 protects the internal components of the cap 10 and its lower end part 47' prevents anyone from getting access to the shank 14 with a tool and trying to turn the closure member 11 when the container is holding pressurized steam and the closure member 11 and knob 12 are uncoupled from each other; the wall 48 protects the underside of the internal components of the cap and prevents access to these.

Variations and/or additions to what has been described above and illustrated are obviously possible.

The configuration both of the parts that make up the cap and of their details may vary; for instance, variations of the shape of the components and/or variations in the number of their details (arms, teeth, projections) may be envisaged.

The manometer here described and illustrated proves, as seen earlier, to be particularly advantageous. However, the use of other types of manometer must not be ruled out.

The cap here described and illustrated may obviously be applied to any container under pressure to satisfy the requirements of a high degree of safety.

What is claimed is:

1. Safety cap for a container containing steam under pressure, comprising a closure member screwed onto the mouth of the container, an external knob which the user can turn to screw the closure member on and off, and an internal diaphragm which is moved by the action of the pressure of the steam, the diaphragm having a rest position, when the steam pressure is low or zero, in which the closure member and the knob are coupled in rotation to allow the cap to be unscrewed, and an operating position, when the pressure is high, which breaks said coupling and prevents the cap from being unscrewed, which cap is characterized in that it comprises a manometer, incorporated in the cap and readable from the outside, which detects the pressure of steam in the container.

2. Safety cap according to claim 1, in which the manometer comprises indicator means visible through a transparent wall in the top of the cap.

3. Safety cap according to claim 1, in which the manometer comprises an arcuate flattened tubular component communicating at one end with a tube that picks up the pressure signal upstream of the diaphragm and being connected at the other end via linkages to an indicator needle mounted on a dial, the tubular component varying its curvature as a function of the abovementioned pressure signal and moving the indicator needle correspondingly.

4. Safety cap according to claim 3, in which the dial is mounted behind a transparent wall in the top of the knob.

5. Safety cap according to claim 3, in which the dial carries a scale with two consecutive bands, the first green and the next red, along which the indicator needle moves, the green band being for zero or low pressures and the red band for higher pressures.

6. Safety cap according to claim 3, in which the diaphragm acts on an axial bush on which there rests a toothed disc connected rotationally by disconnectable dog connections to the closure member and to the knob, which toothed disc engages, in the rest position of the diaphragm, with the closure member and knob to couple them rotationally to each other, while in the operating position the diaphragm moves the disc axially into a position of disengagement from the closure member and from the knob to uncouple them rotationally from each other, and in which the tube runs axially through a hole in the disc and through the inside of the bush, passes transversely out of the bush through a longitudinal slot in the bush, and re-enters through a transverse hole in the closure member which opens out upstream of the diaphragm.

7. Safety cap according to claim 1, in which the diaphragm acts on an axial bush on which there rests a toothed disc connected rotationally by disconnectable dog connections to the closure member and to the knob, which toothed disc engages, in the rest position of the diaphragm, with the closure member and knob to couple them rotationally to each other, while in the operating position the diaphragm moves the disc axially into a position of disengagement from the closure member and from the knob to uncouple them rotationally from each other.

8. Cap according to claim 1, in which the closure member has a threaded shank that screws onto the mouth of the container and that includes a through hole by way of a vent in an intermediate position.

9. Cap according to claim 1, in which the closure member is provided, upstream of the diaphragm, with a wall containing an eccentric hole for the steam to pass through, and in which the closure member accommodates a seal that provides leaktightness between the closure member and the container mouth and that projects radially towards the middle of the mouth in such a way as to come at least partly over the eccentric hole.

10. Cap according to claim 1, in which the knob comprises a skirt that extends down at least as far as the lower end of the closure member, for the protection of the internal components of the cap and to render the closure member laterally inaccessible.

11. Cap according to claim 10, in which the knob comprises an internal lower transverse closing wall to protect and render inaccessible the internal components of the cap.

12. Cap according to claim 1, in which the knob comprises an internal lower transverse closing wall to protect and render inaccessible the internal components of the cap.

\* \* \* \* \*